United States Patent
Luber et al.

(10) Patent No.: US 8,458,811 B2
(45) Date of Patent: Jun. 4, 2013

(54) MICRO/NANO DEVICES FABRICATED FROM CU-HF THIN FILMS

(75) Inventors: Erik J. Luber, Edmonton (CA); Colin Ophus, Berkeley, CA (US); David Mitlin, Sherwood Park (CA); Brian Olsen, Edmonton (CA); Christopher Harrower, Edmonton (CA); Velimir Radmilović, Piedmont, CA (US)

(73) Assignees: The Governors of the University of Alberta, Edmonton, Alberta (CA); The Regents of the University of California, Oakland, CA (US)

( * ) Notice: Subject to any disclaimer, the term of this patent is extended or adjusted under 35 U.S.C. 154(b) by 0 days.

(21) Appl. No.: 13/072,343

(22) Filed: Mar. 25, 2011

(65) Prior Publication Data
US 2012/0011624 A1    Jan. 12, 2012

Related U.S. Application Data

(60) Provisional application No. 61/317,595, filed on Mar. 25, 2010.

(51) Int. Cl.
*G01Q 60/38* (2010.01)
(52) U.S. Cl.
USPC .................. 850/33; 850/56; 850/59; 850/60; 850/61
(58) Field of Classification Search
USPC .................................. 850/33, 56, 59, 60, 61
See application file for complete search history.

(56) References Cited

U.S. PATENT DOCUMENTS

| 4,904,980 A | 2/1990 | Przybysz et al. |
| 6,101,164 A | 8/2000 | Kado et al. |

FOREIGN PATENT DOCUMENTS

| JP | 2000063971 | 2/2000 |
| WO | 9923483 | 5/1999 |

OTHER PUBLICATIONS

Luber, et al ("All-metal AFM probes fabricated from microstructurally tailored Cu-Hf thin films" Nanotechnology (2009), 20(34), 345703/1-345703/9).*
Binning, G. et al.; Surface studies by scanning tunneling microscopy; Phys. Rev. Lett.; 1982; vol. 49; pp. 57-61.
Albrecht, T.R. et al; Microfabrication of cantilever styli for the atomic force microscope; J. Vac. Sci. Technol.; 1990; vol. A 8; pp. 3386-3396.
Akamine, S. et al.; Improved atomic force microscope images using microcantilevers with sharp tips; Appl. Phys. Lett.; 1990; vol. 57; pp. 316-318.
Cavalcoli, D. et al.; Degeneracy and instability of nanocontacts between conductive tips and hydrogenated nanocrystalline Si surfaces in conductive atomic force microscopy; Nanotechnology; 2009; vol. 20; p. 045702.
Mamin, H.J. et al.; Thermomechanical writing with an atomic force microscope tip; Appl. Phys. Lett.; 1992; vol. 61; pp. 1003-1005.
Yoshida, S. et al.; Conductive polymer patterned media fabricated by diblock copolymer lithography for scanning multiprobe data storage; Nanotechnology; 2008; vol. 19; p. 475302.

(Continued)

*Primary Examiner* — Michael Maskell
(74) *Attorney, Agent, or Firm* — Bennett Jones LLP

(57) ABSTRACT

An all-metal microdevice or nanodevice such as an atomic force microscope probe is manufactured from a copper-hafnium alloy thin film having an x-ray amorphous microstructure.

9 Claims, 12 Drawing Sheets

OTHER PUBLICATIONS

Yang, F. et al.; Thermomechanical formation and recovery of nanoindents in a shape memory polymer studied using a heated tip; Scanning; 2008; vol. 30; pp. 197-202.

De Abril, O. et al.; Single-step electrochemical nanolithography of metal thin films by localized etching with an AFM tip; Nanotechnology; 2008; vol. 19; p. 325301.

Johannes, M.S. et al.; Three-dimensional design and replication of silicon oxide nanostructures using an atomic force microscope; Nanotechnology; 2007; vol. 18; p. 345304.

Palacio, M. et al.; Nanomechanical and nanotribological characterization of noble metal-coated AFM tips for probe-based ferroelectric data recording; Nanotechnology; 2008; vol. 19; p. 105705.

Bhushan, B. et al.; Thermally-treated Pt-coated silicon AFM tips for wear resistance in ferroelectric data storage; Acta Mater.; 2008; vol. 56; pp. 4233-4241.

Birkelund, K. et al.; New approaches to atomic force microscope lithography on silicon; J. Vac. Sci. Technol.; 1997; vol. B 15; pp. 2912-2915.

Radmacher, M. et al.; Improvement of thermally induced bending of cantilevers used for atomic force microscopy; Scanning; 1999; vol. 17; pp. 1170-1221.

Zou, J. et al.; A mould-and-transfer technology for fabricating scanning probe microscopy probes; J. Micromech. Microeng.; 2004; vol. 14; pp. 204-211.

Chand, A.; Microfabricated small metal cantilevers with silicon tip for atomic force microscopy; J. Microelectromech. Syst.; 2000; vol. 9; pp. 112-116.

Lee, Z. et al.; Metallic NEMS components fabricated from nanocomposite Al—Mo films; Nanotechnology; 2006; vol. 17; pp. 3063-3070.

Luber, E. et al.; Tailoring the microstructure and surface morphology of metal thin films for nano-electro-mechanical systems applications; Nanotechnology; 2008; vol. 19; p. Q.4.

Duan, G. et al.; High copper content bulk glass formation in bimetallic Cu—Hf system; Metall. Mater. Trans.; 2005; vol. A 36A; pp. 455-458.

Oliver, W.C. et al.; Measurement of hardness and elastic modulus by instrumented indentation: advances in understanding and refinements to methodology; J. Mater. Res.; 2004; vol. 19; p. 3.

Shull, A.L. et al.; Measurements of stress during vapor deposition of copper and silver thin films and multilayers; J. Appl. Phys.; 1996; vol. 80; pp. 6243-6256.

Dmowski, W. et al.; Local atomic structure in disordered and nanocrystalline catalytic materials; Z. Kristallogr.; 2007; p. 222.

Sheng, H.W. et al.; Atomic packing and short-to-medium-range in metallic glasses Nature; 2006; vol. 439; pp. 419-425.

Drits, V. et al.; XRD measurement of mean crystalline thickness of illite and illite/smectite: reappraisal of the Kubler index and the Scherrer equation; Clays Clay Miner.; 2007; vol. 45; pp. 461-475.

Bhatia, A.B. et al.; Structural aspects of the electrical resistivity of binary alloys; Phys. Rev.; 1970; vol. B 2; pp. 3004-3012.

Singh, R.N. et al.; Temperature-dependence of the thermodynamic functions of strongly interacting liquid alloys; J. Phys.: Condens. Matter; 1992; vol. 4; pp. 5345-5358.

Liang, D. et al.; Reevaluation of the Cu—Hf binary system J. Alloys Compounds; 2006; vol. 426; pp. 101-105.

Zhang, L. et al.; Bulk metallic glasses with large plasticity: composition design from the structural perspective; Acta Mater.; 2009; vol. 57; pp. 1154-1164.

Spaepen, F.; Interfaces and stresses in thin films; Acta Mater.; 2000; vol. 48; pp. 31-42.

Thompson, C.V. et al.; Stress and grain growth in thin films; J. Mech. Phys. Solids; 1996; vol. 44; pp. 4657-4673.

Senturia, S.D.; Microsystem Design; New York, NY: Springer+BusinessMedia Inc.; 2001.

Williams, K.R. et al.; Etch rates for micromachining processing—part ii; J. Micromech. Microeng.; 2003; vol. 12; pp. 761-778.

Sarajlic, E. et al.; Towards wet anisotropic silicon etching of perfect pyramidal pits; Microelectron. Eng.; 2007; vol. 84; pp. 1419-1422.

Ophus, C. et al.; Resonance properties and microstructure of ultracompliant metallic nanoelectromechanical systems resonators synthesized from Al—32Mo amorphous—nanocrystalline metallic composites; Appl. Phys. Lett.92; 2008.

Hall, J. J.; Electronic effects in the elastic constants of n-type silicon; Phys. Rev.; 1967; vol. 161; pp. 756-761.

Sandberg, R. et al.; Temperature and pressure dependence of resonance in multi-layer microcantilevers; J. Micromech. Microeng.; 2005; vol. 15; p. 1454.

Steen, J.A.J. et al.; Electrically Conducting Probes With Full Tungsten Cantilever and Tip for Scanning Probe Applications; IOP Publishing; Nanotechnology; 2006; vol. 17; 99. 1464-1469.

Ou, Keng-Liang; Integrity of Copper-Hafnium, Hafnium Nitride and Multilayered Amorphous-Like Hafnium Nitride Metallization Under Various Thickness; Science Direct; 2006; Microelectronic Engineering; vol. 83, pp. 312-318.

Matsubara, H. et al.; Studies of Multilayers of Cu-Hf with a Variable-Energy Positron Beam; Science Publishers; 1994; Hyperfine Interations; vol. 84; pp. 159-164.

Ghosh, G.; First-Principles Calculations of Structural Energetics of Cu-TM (TM = Ti, Zr, Hf) Intermetallics; Science Direct; 2007; Acta Materialia; vol. 55; pp. 3347-3374.

Basu, Joysurya et al.; Glass Forming Ability: Miedema Approach to (Zr, Ti, Hf)-(Cu, Ni) Binary and Ternary Alloys; Elsevier; 2008; Journal of Alloys and Compounds; vol. 465; pp. 163-172.

Molnar, Arpad et al.; Surface Characterization of Cu-M (M = Ti, Zr, or Hf) Alloy Powder Catalysts; J. Phys. Chem.; 1998; American Chemical Society; vol. 102; pp. 9258-9265.

Turchanin, M.A. et al.; Thermodynamic Assessment of the Copper-Hafnium System; Springer Science; 2008; Powder Metallurgy and Metal Ceramics; vol. 47, No. 3-4; pp. 223-233.

Senturia, S.D.; Microsystem Design; New York; NY: Springer+Business Media Inc.; 2001.

* cited by examiner

MICRO/NANO DEVICES FABRICATED FROM CU-HF THIN FILMS

CROSS-REFERENCE TO RELATED APPLICATIONS

The present application claims the priority of U.S. Provisional Patent Application Ser. No. 61/317,595, entitled AFM Probes Fabricated from Cu—Hf Thin Films filed Mar. 25, 2010, the contents of which are incorporated herein by reference in its entirety.

STATEMENT OF GOVERNMENTAL SUPPORT

The invention described and claimed herein was made in part utilizing funds supplied by the U.S. Department of Energy under Contract No. DE-AC02-05CH11231. The government has certain rights in this invention.

FIELD OF THE INVENTION

The present invention relates to cantilevered metallic micro/nanodevices, such as atomic force microscopy probes, fabricated from copper-hafnium (Cu—Hf) thin films, and methods of making such probes.

BACKGROUND

A growing number of atomic force microscope (AFM) applications make use of metal-coated probes. Probe metallization can cause adverse side-effects and disadvantages such as stress-induced cantilever bending, thermal expansion mismatch, increased tip radius and limited device lifetime due to coating wear.

Since the inception of the atomic force microscope (AFM) [1], its versatility and usefulness as a characterization, measurement and fabrication tool has expanded beyond simple topographic imaging. Currently AFM probes are typically made from Si [2], $SiO_2$ and $Si_3N_4$ [3]. These silicon-based materials are so ubiquitously used since they are elastically stiff, very hard and easy to process. Unfortunately these materials possess low electrical conductivity and poor optical reflectivity. An increasing number of applications make use of optically reflective cantilevers and electrically or thermally conducting tips, which is typically accomplished by coating the AFM probe with a metal layer. Despite providing the desired optical, thermal or electrical properties, metal coatings produce adverse side-effects.

The extremely high spatial resolution of the AFM is what makes it such a unique and useful tool. Important technological applications that make use of the high spatial resolution of a conductive AFM tip are conductive atomic force microscopy (C-AFM) [4], thermomechanical data storage [5-7], electrochemical nanolithography by local metal etching [8], local anodic oxidation [9] and ferroelectric data storage [10], to name just a few. A fundamental problem caused by metallization of the AFM tip is increased tip radius, resulting in a loss of spatial resolution. It is straightforward to show that the tip radius of a conformally coated parabolic tip is the sum of the coating thickness and tip radius prior to coating. Therefore, tip radius is significantly restricted by the thickness of the metallization layer, which is typically made to a minimum thickness of 15-20 nm [8] simply to ensure film continuity. This problem is further compounded by wear of the metal coating.

It has recently been shown that, after acquiring just a few C-AFM maps, wear of the tip coating produces significant artifacts which are often quite difficult to detect [4]. Wear of metal-coated AFM tips is also particularly important in SPM-based recording technologies, such as ferroelectric data storage [10, 11], which promises ultrahigh areal data density.

Increasing the thickness of the deposited metal layer is not a viable solution to increasing probe lifetime, as the tip radius becomes significantly larger and stresses in the metal layer can induce significant bending of the cantilever, to the extent that alignment in the AFM system becomes impossible [12].

As shown by Birkelund et al. [12] the use of all-metal probes for AFM nanolithography resulted in a tenfold increase in lifetime compared to conventional titanium-coated silicon nitride cantilevers. This large enhancement in device lifetime was a result of maintaining conductivity despite continuous wear of the tip. These probes were fabricated by a combination of silicon micromachining and electroforming, resulting in nickel probes with a gold coating. Due to the bilayer nature of these probes they are still susceptible to thermal mismatch bending [13]. Other authors have fabricated single-layer all-metal AFM cantilevers [14], but are limited to metals that can be electroplated, with nickel often being the material of choice. Moreover, these cantilevers are often made to be very stiff (low force sensitivity, thickness >4 µm) to avoid excessive cantilever bending due to residual stress gradients that can develop during film growth. Chand et al. reported a process for the fabrication of high resonant frequency and force sensitivity bilayer Au/Ti cantilevers with an integrated silicon tip [15]. The combination of high resonant frequency and force sensitivity was achieved by reducing the cantilever dimensions (13-40 µm long and 100-160 nm thick). These cantilevers were unusably bent upon initial release due to residual stress gradients caused by competitive grain growth, but the devices were straightened using rapid thermal annealing. Unfortunately this process only produced a 60% device yield.

All-metal AFM probes consisting of a single material will have tip radii limited by the fabrication procedure, possess superior device lifetime (independent of tip radii) and be immune to thermal expansion mismatch bending. It has been shown that uncurled metal cantilevers can be fabricated from thin film metallic glasses [16, 17]. The uncurled nature of the cantilevers was attributed to the lack of grains and consequent differential stress induced by grain size gradients throughout the film thickness. Due to the specific thermodynamic properties of the alloys used, large solute content was needed in order to achieve the desired amorphous microstructure, which resulted in an undesirable loss in electrical conductivity [16, 17]. Moreover, chemical etching of these films proved difficult due to the high solute content, limiting fabrication to small thicknesses using a liftoff process.

SUMMARY OF THE INVENTION

Microstructural design may be used to mitigate the limitations of the prior art to create a metallic thin film alloy that permits the fabrication of metallic micro/nanodevices, including cantilevers. Embodiments of the invention comprise a thin film metallic alloy with low differential stress. While pure metal films possess significant stress gradients, and as a result cantilevered devices machined from these will be unusable due to significant bending, the alloys of the present invention do not display significant bending.

In one aspect, the invention comprises the use of low differential stress metallic alloys to produce singly-clamped microdevices or nanodevices. In one embodiment, the micro/nanodevice is a cantilevered device, which may be an AFM probe. As the metallic AFM probe of the present invention is electrically conductive, these probes may be used in:

- conductive AFM, which gives a map of the electrical properties of the surface being examined;
- electrochemical nanolithography, which allows for nanoscale patterning of surfaces;
- ferroelectric data storage, which has potential for very high data storage densities of hard drives, but must be read with a conductive probe;
- NSOM (near-field scanning optical microscopy), a method for breaking the resolution limit of optical microscopy techniques, where light is passed through an AFM tip with an aperture as it scans over the surface; or
- scanning microwave microscopy (SMM), in which a microwave signal is passed through a conductive probe and reflected off a surface being interrogated, wherein the reflected signal gives a map of impedance, capacitance, and dielectric properties, and may be used to give estimates of the carrier densities in semiconductors.

Thus, in one aspect, the invention comprises an all-metal AFM cantilever comprising a copper-hafnium alloy having an x-ray amorphous microstructure. The copper-hafnium alloy ceases to have an x-ray amorphous structure where the atomic ratio of Cu to Hf is less than about 30:70 ($Cu_{30}Hf_{70}$) and greater than about 95:5 ($Cu_{95}Hf_5$). The present invention comprises any atomic ratio of Cu to Hf which still exhibits an x-ray amorphous microstructure, including any ratios between 30:70 and 95:5. In one embodiment, the alloy is $Cu_{90}Hf_{10}$.

In another aspect, the invention comprises a microfabrication process to create Cu—Hf AFM probes, which may preferably be $Cu_{90}Hf_{10}$. Uncurled, 1 μm thick cantilevers having lengths of 100-400 gm may be fabricated, with tip radii ranging from 10 to 40 nm.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows:

FIG. 8(*b*). Shows cross-sectional view of 1 μm thick Cu film showing undesirable roughness.

FIG. 10A shows a set of three cantilevers with lengths of 100, 200 and 400 μm. The 100 and 200 μm long cantilevers are essentially flat, while the very long cantilever exhibits some bending. FIG. 10B shows a single 200 μM long cantilever. FIG. 10C shows a 150 μm long cantilever that is slightly curved, but definitely usable in the AFM. FIG. 10D shows a close-up of a pyramidal tip, showing a sub-10 nm tip radius.

DETAILED DESCRIPTION OF PREFERRED EMBODIMENTS

The present invention relates to all-metal micro/nanodevices, such as AFM probes, which are fabricated from Cu—Hf thin films. Any term or expression not expressly defined herein shall have its commonly accepted definition understood by those skilled in the art.

As used herein, "microdevice" means a device having a critical dimension on the order of 1 μm or less, and "nanodevice" means a device having a critical dimension on the order of 100 nm or less.

As used herein, "thin film" means a layer of material which is on the order of micrometers in thickness, for example, 1 to 2 micrometers thick.

As used herein, "amorphous" means a solid that lacks long-range order of the position of the atoms. As used herein, "nanocrystalline" means a material which comprises nanoparticles which are crystalline. A nanoparticle may be any particle having a dimension less than about 100 nm.

Figure 2:
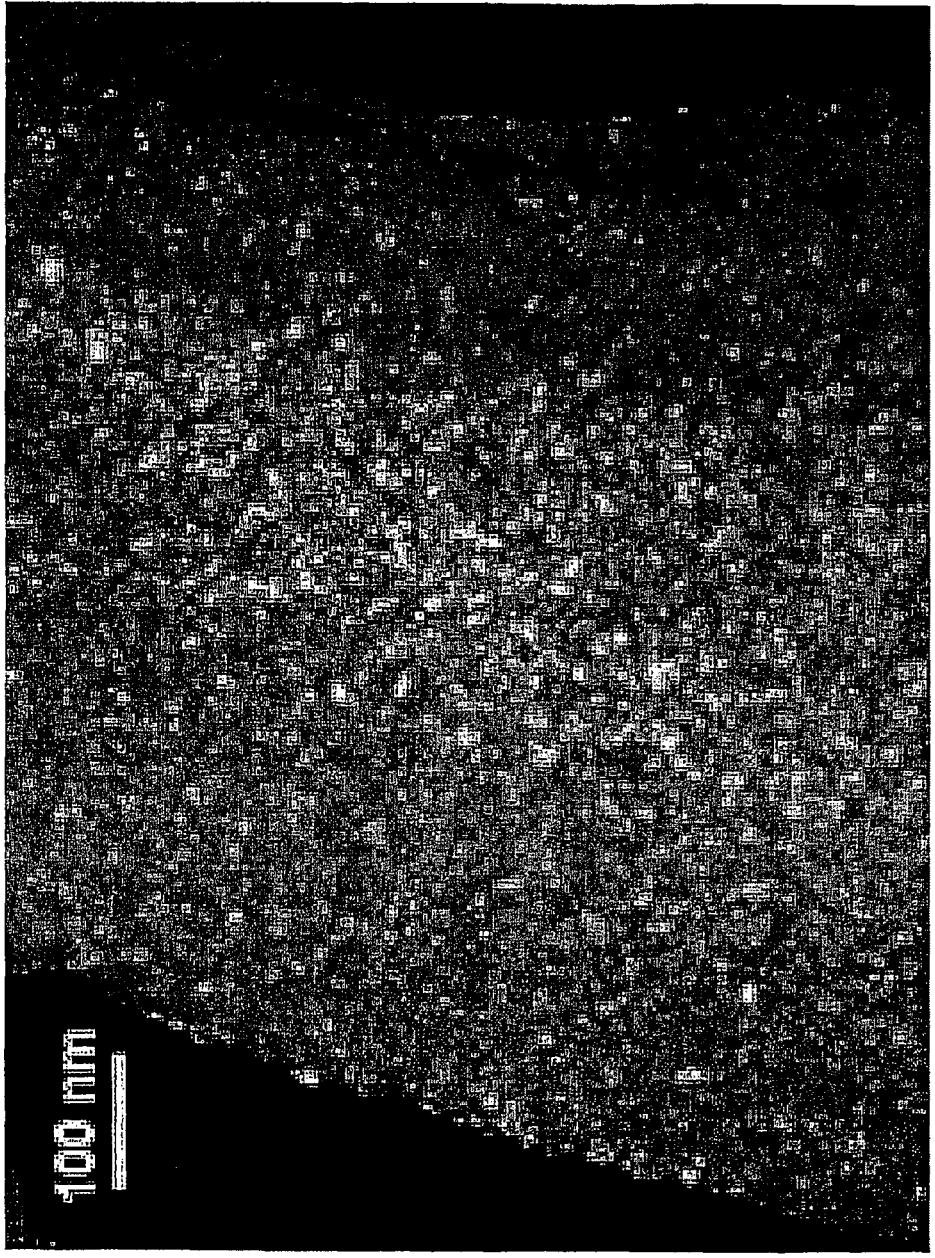
FIG. 2. Dark Field cross-sectional TEM micrograph of $Cu_{90}Hf_{10}$ taken from the (111) reflection of FIG. 1.

As used herein, the term "x-ray amorphous" means a solid which when subjected to x-ray diffraction (XRD), shows a single broad peak in an XRD curve, demonstrating that it is either amorphous, extremely nanocrystalline or a combination of both. In specific embodiments of the present invention described below, the x-ray amorphous thin films have an amorphous matrix with interspersed nanocrystalline particles. As may be seen in FIG. 2, one embodiment of the thin film alloys of the present invention have nanocrystals which have a host fcc copper lattice with hafnium in solid solution. The amorphous matrix is copper rich, but contains hafnium.

In one embodiment, the present invention comprises an x-ray amorphous nanocrystalline thin film alloy, which may be used to fabricate singly-clamped metallic microdevices or nanodevices, such as an all-metal AFM probe. In one embodiment, the probe can be fabricated to arbitrary size and geometry from a single structural material that possesses metallic conductivity and reflectivity. A suitable alloy system is selected and the composition may then be tuned for optimal material properties. The thin film alloy system comprises Cu—Hf.

The Cu—Hf probes of the present invention are x-ray amorphous, and comprises nanocrystalline copper-hafnium particles in an amorphous copper-hafnium matrix. The Cu—Hf alloy thin film ceases to have an x-ray amorphous structure where the atomic ratio of Cu to Hf is less than about 30:70 ($Cu_{30}Hf_{70}$) and greater than about 95:5 ($Cu_{95}Hf_5$). The present invention comprises any atomic ratio of Cu to Hf which still exhibits an x-ray amorphous microstructure, including any ratios between 30:70 and 95:5, or 94:6, or 93:7, or 92:8, or 91:9, or 90:10. Alloys in the range of about $Cu_{68}Hf_{32}$ show greater hardness than other alloys. Alloys in the range of about $Cu_{42}Hf_{58}$ are nearly free of differential stress. In one embodiment, the alloy comprises 90% Cu and 10% Hf atoms ($Cu_{90}Hf_{10}$).

As described herein, Cu—Hf films may be fabricated by a co-sputtering process, and may be characterized using x-ray diffraction (XRD), nanoindentation, four-point probe and in-situ multi-beam optical stress sensing (MOSS). Metallic glass $Cu_{90}Hf_{10}$ films are found to possess a combination of electrical resistivity (96 μΩcm), nanoindentation hardness (5.2 GPa), ductility and incremental stress which may be useful as an AFM probe tip. A continuum model is developed which uses measured MOSS data to predict cantilever warping caused by stress gradients generated during film growth.

Cu—Hf is capable of forming glassy alloys in the bulk [18]. As expected, the range of amorphous compositions was much broader when it was deposited as a thin film, as it is vapor-quenched during deposition. Also, since the best glass former is on the copper-rich side, vapor quenching results in glassy films at low hafnium concentrations.

In one embodiment, Cu—Hf AFM probes may be fabricated by a method comprising the general steps of tip mold fabrication, film deposition and cantilever patterning, probe release and block attachment. In another embodiment, Cu—Hf AFM probes may be fabricated using a standard lift-off procedure.

In one embodiment, the starting point is the patterning of inverted pyramidal pits in a silicon wafer, which is to be used as a mold for the probe tips. The pyramidal pits are formed by etching of exposed square areas. Prior to etching, a masking layer is deposited (with an adhesion layer if necessary), followed by the addition of a resist. Using optical lithography, or other suitable techniques, an array of square holes are patterned in the masking layer.

The tip radius and subsequent spatial resolution of the AFM probes are significantly affected by knife-edging during the etching procedure. During lithography the square openings used for etching are oriented at 45° with respect to the wafer flat. Once the tip mold has been machined, a film of the Cu—Hf alloy is deposited on the tip mold and patterned into cantilevers. The film may be deposited by any suitable technique, such as co-sputtering of pure targets, sputtering of an alloy target, pulsed laser deposition, evaporation and electrodeposition.

The deposited thin film is then patterned and etched. To release the cantilevers from the substrate a sacrificial layer is deposited onto the mold prior to deposition of the alloy thin film. The sacrificial layer is preferably very smooth, such as aluminum-molybdenum alloys which show a dramatic reduction of surface roughness [16, 33]. A 200 nm thick layer of $Al_{94}Mo_6$ was found to provide both reasonable etch rates and tip radii. Thinner sacrificial layers may provide smoother surfaces, but at the expense of etch time Furthermore, any material can be used for a sacrificial layer provided it is very smooth and can be selectively etched with respect to the substrate and Cu—Hf.

Chromium etching may be used for alloys having a copper content of 88 at % or greater, however, may not be suitable for copper content less than about 88 at %. In order to pattern Cu—Hf films having Hf content greater than 12%, a standard lift-off procedure may be used. For example, prior to deposition of the Cu—Hf film, a photoresist layer is spun onto the substrate surface, and patterned into the negative mask of the cantilever features. The Cu—Hf is then deposited on top of patterned wafer, followed by dissolution of the photoresist in acetone. As a result, the sections of the Cu—Hf film that were deposited on top of the photoresist film will also be removed, leaving the desired patterning of the Cu—Hf film.

Lastly, the patterned Cu—Hf probes are removed from the substrate. Small silicon blocks may be bonded to the alloy thin film with an adhesive. The thin film may then be pulled off due to the undercutting during the etch of the sacrificial layer. In one embodiment, a mask aligner could be retrofitted to apply the adhesive and remove the cantilevers. Moreover this process could be automated.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

EXAMPLES

The following examples are intended to exemplify claimed embodiments of the invention, and not to be limiting in any way.

Example 1

1 μm nominally thick Cu—Hf films were deposited onto 4 inch (100) naturally oxidized silicon wafers using a direct current (DC) magnetron co-sputtering system (AJA International). Prior to sputtering, the wafers were cleaned using a 3:1 mixture of 51% $H_2SO_4$ and 30% $H_2O_2$. Argon sputtering was maintained at 4.0 mTorr with a base pressure of ≈2.0× $10^{-8}$ Torr, while substrate temperature was maintained at 18° C. Deposition was done in a sputter-up configuration with continuous substrate rotation to ensure film uniformity. Films were deposited in roughly 10 at. % intervals. Film compositions were confirmed using an energy-dispersive x-ray spectroscopy (EDX) detector mounted on a Hitachi S3000N scanning electron microscope (SEM).

Electrical resistivity of the films were calculated by measuring the sheet resistance using a linear four-point probe. Mechanical properties of the films were measured using a commercially available nanoindentation load-depth sensing instrument (Hysitron TriboIndenter), equipped with an AFM.

All the tests were performed under identical conditions, using a Berkovich indenter tip and a target indentation depth of 100 nm. Each data point represents an average value of 25 individual indentations; all indentations were separated by about 25 μm. The hardnesses and reduced moduli are determined from the load-depth curve using the method of Oliver and Pharr [19].

Evolution of film stress was determined using an in situ MOSS system [20]. The MOSS system used for the in situ measurement of substrate curvature was a commercial k-Space Associates Inc. attachment to the sputter system, which uses a 50 mW AlGaInP laser. Prior to deposition, a flat reference of 25 data points was collected.

Film microstructure was analyzed using XRD, which was performed using a Bruker AXS D8 Discover diffractometer with a GADDS area detector used. A Cu Kα radiation source (λ=1.54056 Å) collected the x-ray scans from a sample mounted on a two-axis rotation stage that also allowed for XYZ translation.

Example 2

Microstructure

Figure 1:
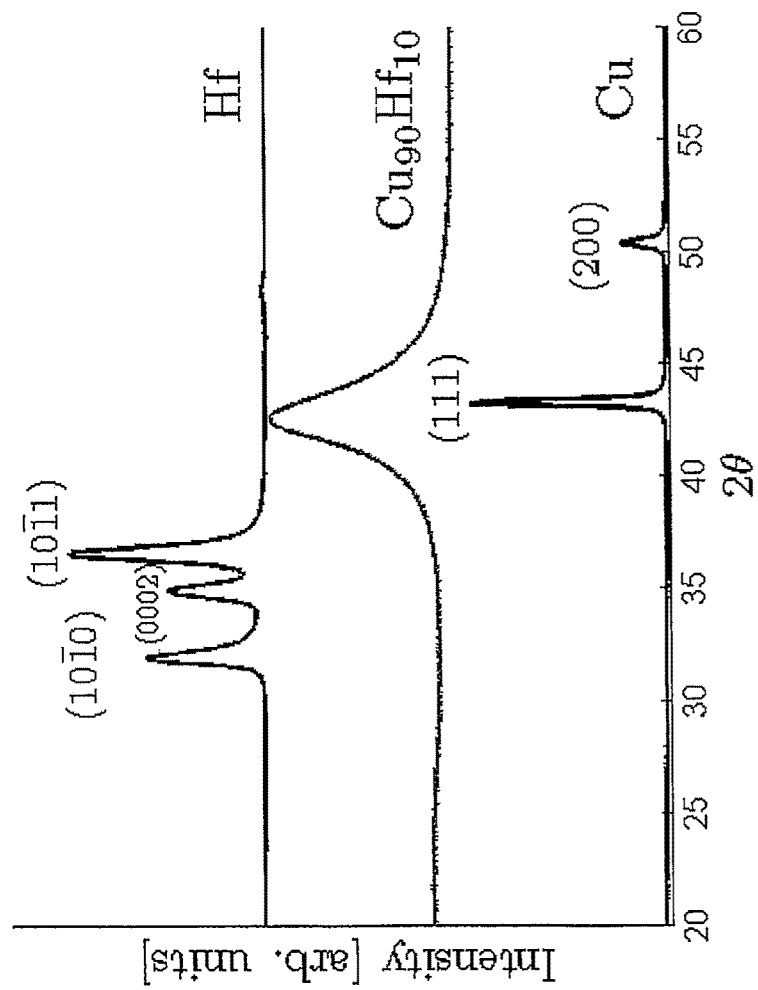
FIG. 1. 0/20 XRD curves of 1 μm thick Cu—Hf films.

Shown in FIG. 1 are the XRD curves of 1μm thick Cu—Hf thin films ranging from pure Cu to pure Hf. As expected, the sputter-deposited pure copper film has a face-centered cubic (fcc) crystal structure and has <111> fiber texture normal to the substrate plane. Even small additions of hafnium result in a fundamental change in the microstructure; the XRD curves of $Cu_{90}Hf_{10}$ through $Cu_{30}Hf_{70}$ consist of a single broad peak. The presence of a single broad peak in an XRD curve is attributed to a lack of long range order in the microstructure, which can be either amorphous, extremely nanocrystalline or a combination of both [21]. Further addition of hafnium results in films having a hexagonal close packed (hcp) crystal structure.

As expected, vapor quenching greatly increases the range of amorphous/nanocrystalline compositions in the Cu—Hf system [18], spanning ≈70 at. % Hf. Determination of the exact structure of the alloys in this composition range requires the use of higher spatial resolution methods such as synchrotron XRD coupled with reverse Monte Carlo simulation [22], due to the lack of any long range structure. Nonetheless, if any crystallites are present their size can be estimated using the Scherrer equation [23], which predicts the average crystallite size in $Cu_{90}Hf_{10}$ to be 2.5 nm in diameter. At higher hafnium concentrations, the Scherrer equation predicts average crystallite sizes less than 1.5 nm. This is a thermodynamically unlikely situation and we conclude that the structure in the composition range of $Cu_{90}Hf_{10}$—$Cu_{30}Hf_{70}$ is largely amorphous. Therefore, these films can be thought to be homogeneous throughout the film thickness, which is critical if uncurled AFM probes are to be fabricated for arbitrary geometries.

Example 3

Electrical Conductivity

Figure 3:
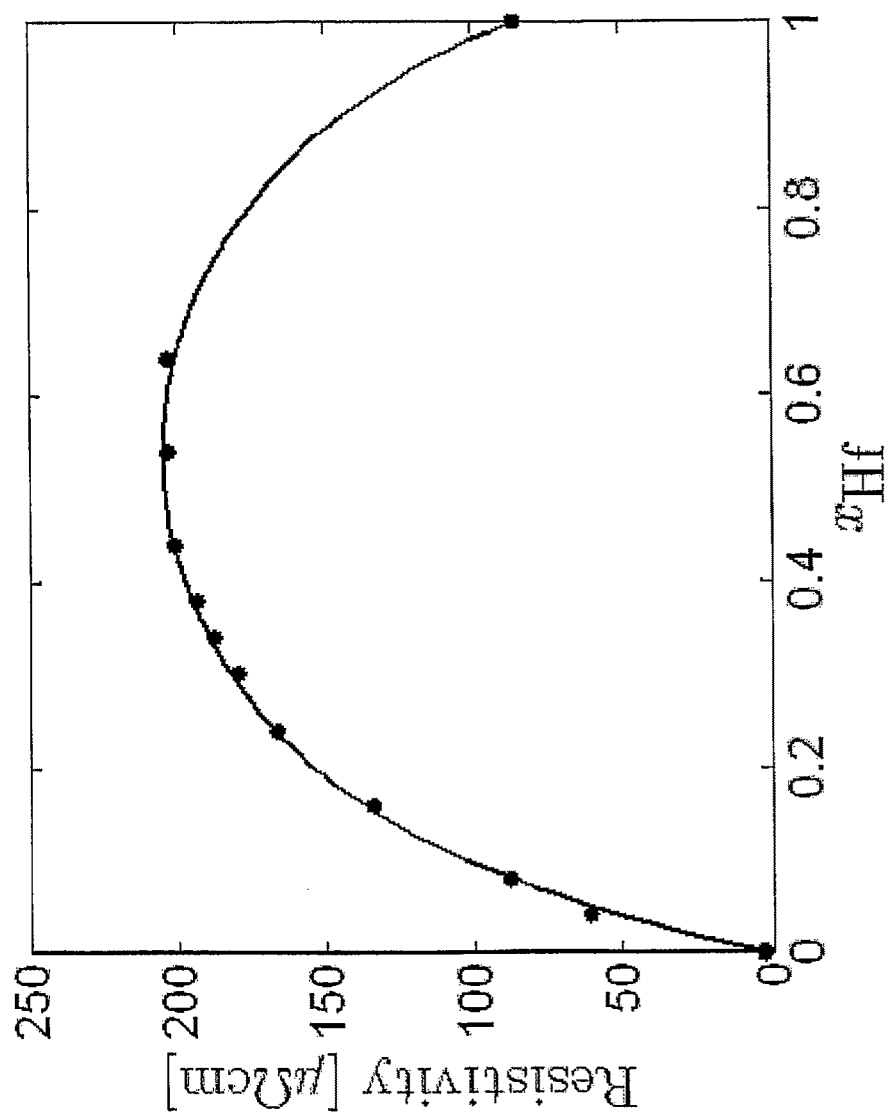
FIG. 3. Measured electrical resistivity of 1 μm thick Cu—Hf thin films (°). Best fit of equation (6) to the experimental resistivities (solid line).

The resistivity of Cu—Hf films as a function of hafnium concentration is shown in FIG. 3. As hafnium is added to copper, which has a measured resistivity of 2.5 μΩcm, the resistivity increases to a maximum of 194 μΩcm at $Cu_{42}Hf_{58}$. Despite the order-of-magnitude increase in resistivity, all film compositions remain metallically conductive.

Understanding the nature of electrical conduction in these Cu—Hf thin films is of significant interest, since it may guide selection of optimal alloy composition and alloy design. As described by Bhatia and Thornton [24], in the long wavelength weak electron scattering approximation, the resistivity of a binary alloy with no superstructure is proportional to the sum of dynamic structure factors $S_{NN}(0)$, $S_{CC}(0)$ and $S_{NC}(0)$. These structure factors physically represent the mean square fluctuation in the number of particles in a volume V, mean square fluctuations in concentration and correlation between fluctuation in number density and concentration, respectively. From thermodynamic arguments it can be shown [24] that $$S_{CC}(0) = nRT \left/ \left(\frac{\partial^2 G}{\partial c^2}\right)_{T,P,n}\right. \quad (1)$$

$$S_{NN}(0) = \frac{n}{V} RT\kappa_T + \delta^2 S_{CC}(0) \quad (2)$$

$$S_{NC}(0) = -\delta S_{CC}(0) \quad (3)$$

where n is the number of moles, R is the ideal gas constant, T is the absolute temperature, G is the Gibbs free energy, P is the pressure, V is the volume and S is the dilatation factor defined by the following:

$$\delta = \frac{v_A - v_B}{(1-x)v_A + xv_B} \quad (4)$$

where $v_A$ and $v_B$ are the partial molar volumes of species A and B, and x is the concentration of species B.

As shown by Singh and Sommer [25], the isothermal compressibility $\kappa_T$ obeys a simple rule of mixtures if there is negligible volume expansion or contraction during mixing. Since the molar volumes of Cu and Hf are significantly different, the dilatation factor is of the order of unity and cannot be neglected. In such a case, it can be shown [24] that $$S_{CC}(0) = \frac{x(1-x)}{1 + x(1-x)\left(\delta^2 \frac{d^2 g(x)}{dx^2} \middle/ RT\right)} \quad (5)$$

where g(x) is the excess Gibbs free energy of mixing.

Therefore to determine the resistivity, we must select an appropriate expression for the Gibbs free energy of mixing. Consistent with CALPHAD modeling of the Cu—Hf system [26] we assume a regular solution model, $g(x)=M_0 x(1-x)$, where $M_0$ is the binary interaction parameter. Substituting this expression into equation (5), and combining equations (1)-(3), we arrive at the following expression for the resistivity as a function of hafnium content x:

$$\rho(x) = K(1 - \delta + \delta^2)\frac{x(1-x)}{1 + x(1-x)(\delta^2 - 2M_0/RT)} + (1-x)\rho_{Cu} + x\rho_{Hf} \quad (6)$$

where K is a scaling constant.

Despite the complex nature of equation (6), the shape of the resistivity versus composition curve is entirely determined by a single parameter, which is the so-called 'alpha value' for regular solutions $\alpha=M_0/RT$. FIG. 3 shows the best fit of equation (6) to the experimentally determined resistivities. The best-fit parameters to this nonlinear equation are determined using a Monte Carlo $L_1$ norm minimization routine, yielding parameters of $\alpha=-0.30$ and K=36 μΩcm. Both the magnitude and sign of $\alpha$ are noteworthy. Firstly, it is of the order of unity, which is the correct order of magnitude for real systems. Secondly, it is negative, which must be the case since the Cu—Hf system has a negative deviation [26]. Having used only one fitting parameter to achieve an excellent fit for all data points, and having a physically interpretable and realistic value for the fitting parameter, strongly underscores the validity of the above method of modeling the electrical conductance in Cu—Hf thin films.

From these results we see that change in electrical conductivity is strongly dominated by local fluctuations in concentration (solute scattering). The excellent agreement of this model not only confirms the disordered structure of these alloys, but underscores the importance of reducing the solute concentration if high electrical conductivity is desired.

Example 4

Film Hardness

Figure 4:
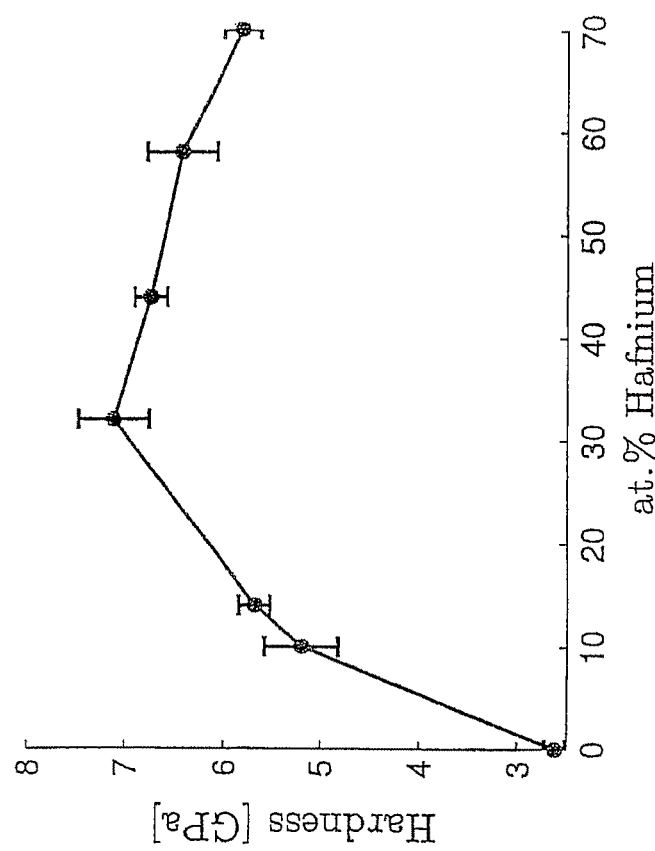
FIG. 4. Nanoindentation hardness of 1 μm thick Cu—Hf thin films. Each data point is an average of 25 indentations, separated by ~25 μm.
Figure 5:
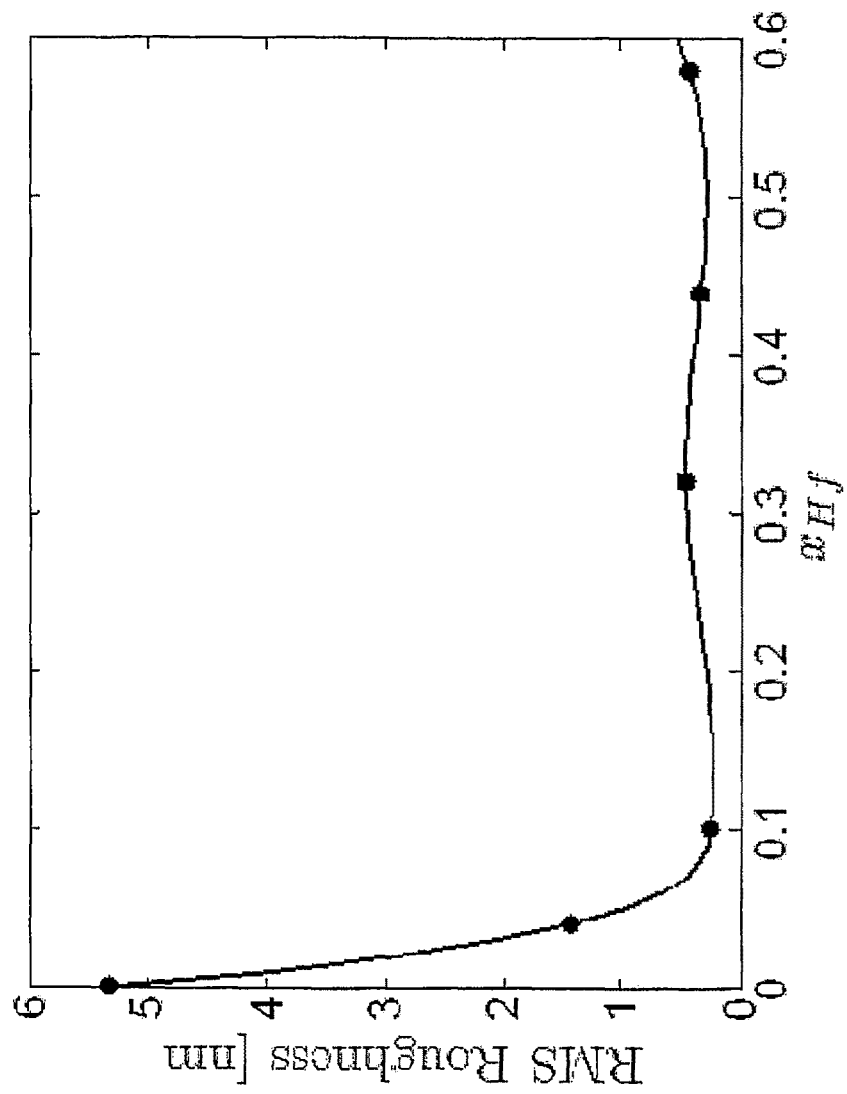
FIG. 5. RMS surface roughnesses of 1 μm thick Cu—Hf films as a function of Hf concentration.

The nanoindentation hardness of Cu—Hf films as a function of hafnium concentration is as shown in FIG. 4. There is a significant increase in hardness with the addition of small amounts of hafnium, with $Cu_{90}Hf_{10}$ showing a twofold improvement over pure copper. As the hafnium content is further increased, the hardness continues to increase, until a maximum hardness is reached at $Cu_{68}Hf_{32}$. Inspection of FIG. 4 shows a compositional dependence on the hardness within the range of glassy alloys. Zhang et al. [27] have proposed a model explaining the origin of plasticity in metallic glasses, having important ramifications regarding alloy selection in this study. Motivated by the large compositional differences observed in certain metallic glasses, Zhang et al. [27] show that atoms possessing icosahedral coordination environments are the least likely to participate in plastic flow events, since the icosahedral coordination environment has higher symmetry and packing, and is more energetically stable than other coordination polyhedra. Consequently the amount of plasticity is mediated by the fraction of icosahedral coordination polyhedra. A method for maximizing metallic glass plasticity can be accomplished by minimizing the solute concentration; when solute and solvent have significantly different atomic radii, the formation of icosahedral coordination is geometrically unfavorable at low solute concentrations. Furthermore, it is found that increased hardness and glass transition temperature correlates with decreased plasticity [27]. From this standpoint, we can understand that the compositional variation of hardness observed in glassy Cu—Hf films is a result of changing coordination environments, with maximal icosahedral coordination occurring within the vicinity of $Cu_{68}Hf_{32}$. This is in excellent agreement with the maximum glass transition temperature of the bulk Cu—Hf system occurring at $Cu_{64}Hf_{36}$ [18].

Example 5

Film Stress

Figure 6:
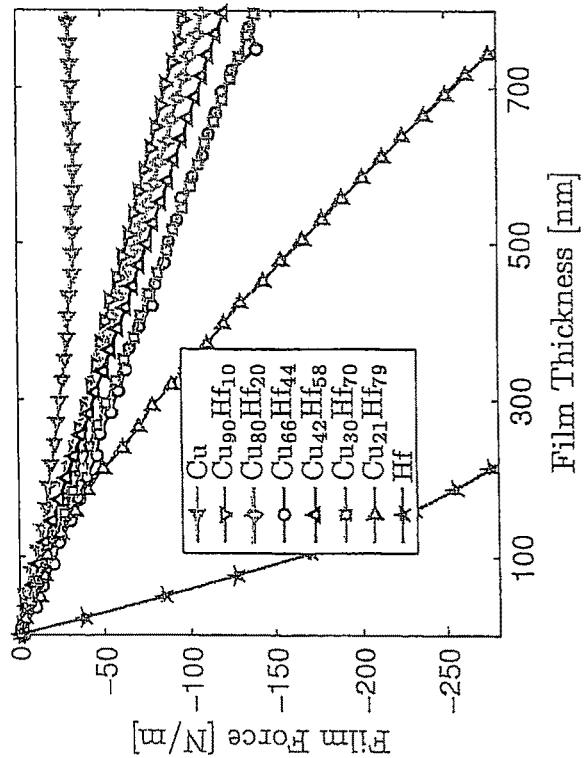
FIG. 6. Film force evolution during deposition of Cu—Hf films.

In situ measurement of substrate curvature during deposition yields important information about the stress distributions in Cu—Hf films. Shown in FIG. 6 are the film force curves for Cu—Hf films. The film force curve is related to both the average stress given by the Stoney equation and the incremental stress, which is the stress in the layer being added [28]. The average stress, σ, is given by the slope of a line from the origin to any point on the film force curve:

$$(\sigma) = f/t \tag{7}$$

where f is the film force and t is the film thickness. The incremental stress is the slope of the film force curve:

$$\sigma(t) = \frac{df}{dt}. \tag{8}$$

Inspection of the film force curves shows significant differences between the crystalline Cu film and the amorphous Cu—Hf films. The amorphous films exhibit nearly linear force curves, which implies that there are no gradients in the incremental stress, i.e. the film stresses are uniform throughout the film thickness. In comparison, the slope of the Cu film force changes significantly throughout the film thickness due to the non-uniform microstructure, as a result of competitive grain growth [29]. The presence of internal stress gradients within the film will result in cantilever bending. For a rectangular cantilever of thickness h, width W and length L, subject to an internal axial moment $M_x$, it can be shown [30] that the beam will bend with a curvature of $K_B$:

$$\kappa_B = \frac{12M_x}{M_f W h^3} \tag{9}$$

where $M_f$ is the biaxial film modulus and $M_x$ is the internal bending moment:

$$M_x = \int_0^h W(t-h/2)\sigma(t)dt. \tag{10}$$

A positive curvature indicates that the cantilever will bend away from the substrate. Now, if we substitute equation (8) into equation (10) the internal bending moment is $$M_x = W\left(\frac{h}{2}f(h) - \int_0^h f(t)dt\right). \tag{11}$$

Substituting this relation into equation (9) we arrive at an expression for the curvature $\kappa_B$ of a released cantilever fabricated from a film with a film force of f(t):

$$\kappa_B = \frac{12}{M_f h^3}\left(\frac{h}{2}f(h) - \int_0^h f(t)dt\right) = \frac{12}{M_f h^3} f_B. \tag{12}$$

The term in brackets, $f_B$, has units of force and is termed the bending force. Increased bending force results in a proportional increase in the bending of the released cantilever.

Figure 7:
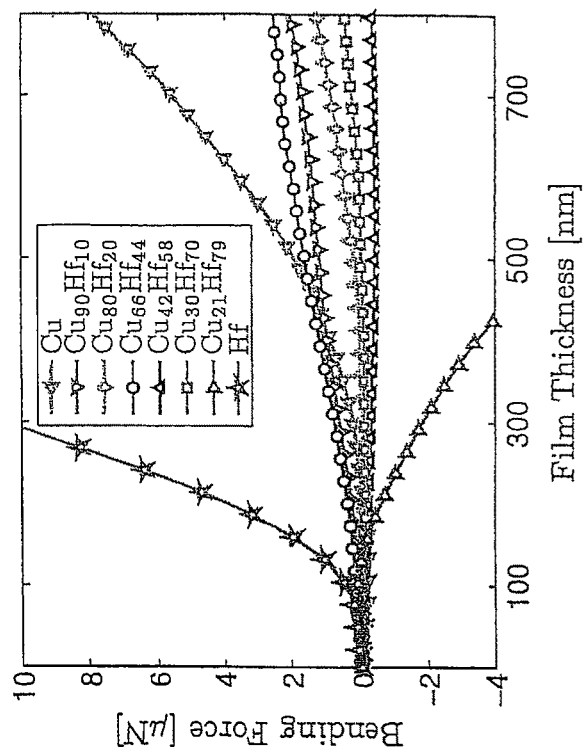
FIG. 7. Bending force curves of Cu—Hf films. Large bending force will result in a proportionate increase in the bending of the released cantilever.

Physically, as seen in equation (12), the bending force is simply the deviation from uniform stress. The bending force curves of Cu—Hf films are shown in FIG. 7.

Example 6

Alloy Selection

Based on the extensive characterization results above, a preferred composition of Cu—Hf for a particular use may be determined, for example to be used for the fabrication of all-metal AFM probes. In order to fabricate probes to arbitrary size and geometry, it is necessary that the internal film stresses do not cause significant bending for a large range of lengths and thicknesses. The amount of cantilever bending, as a function of film thickness, is predicted by equation (12) and plotted in FIG. 7.

Figure 8:
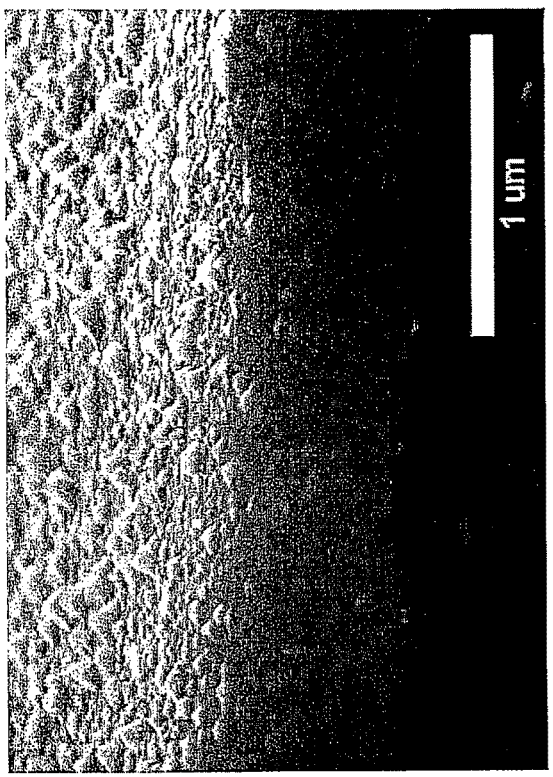
FIG. 8(*a*). 100 μm×50 μm×1 μm copper cantilever. Due to internal stress gradients the cantilever exhibits significant curling upon release.
Figure 8:
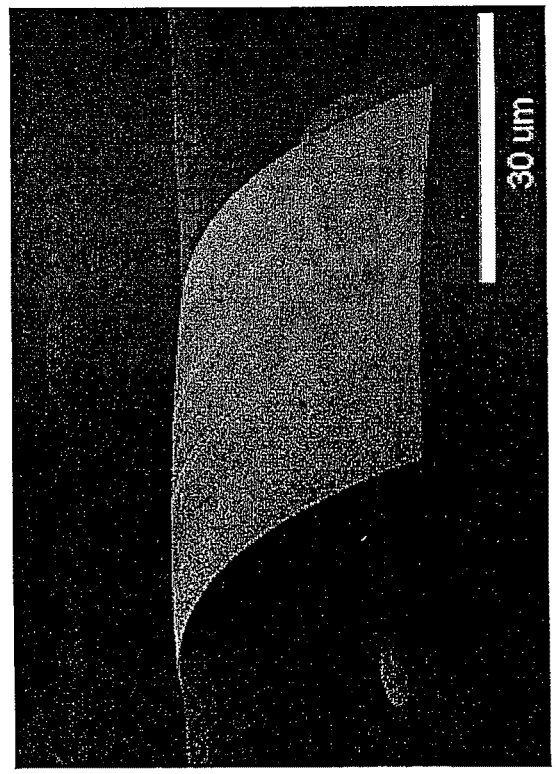
Figure 9B:
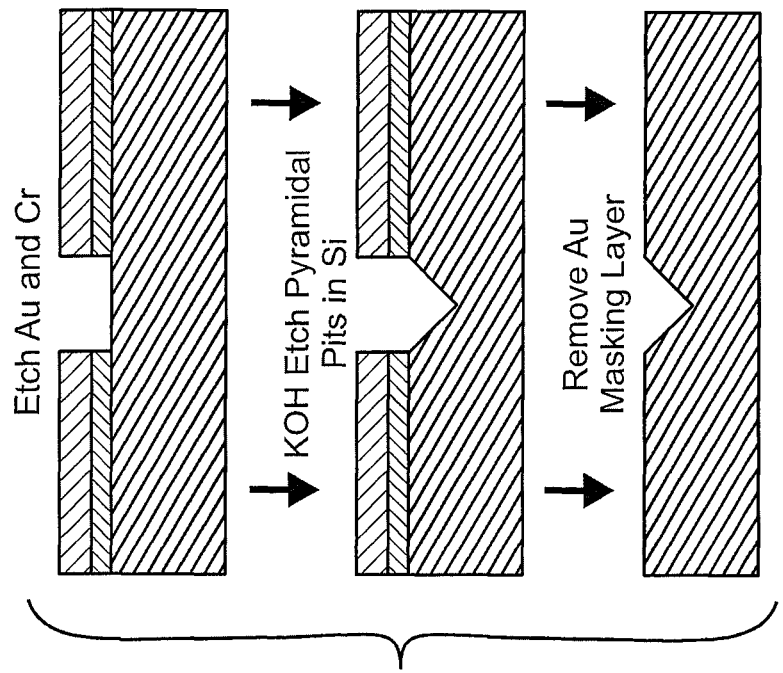
FIGS. 9A-9D. Process flow for the microfabrication of all-metal $Cu_{90}Hf_{10}$ AFM probes.
Figure 9A:
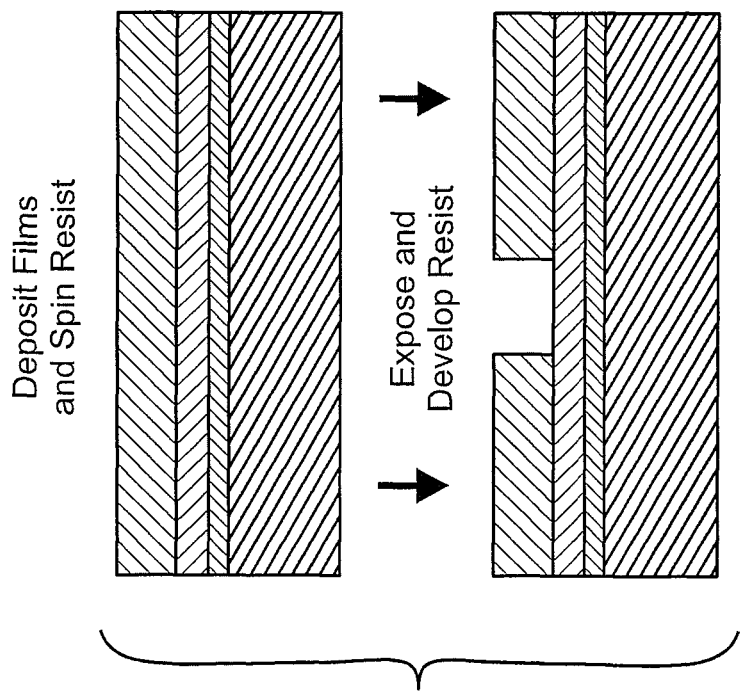
Figure 9D:
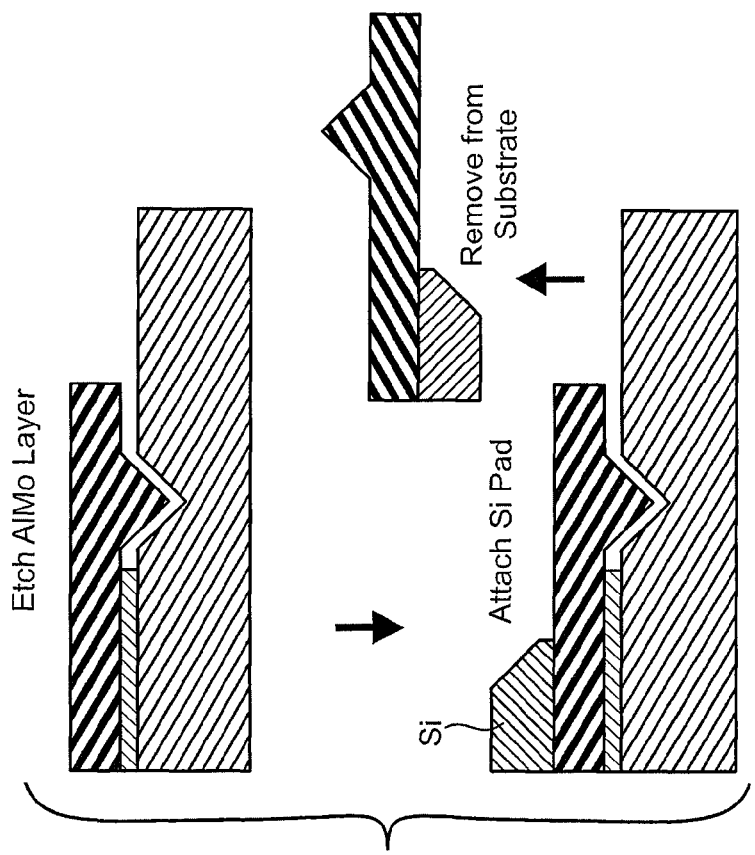
Figure 9C:
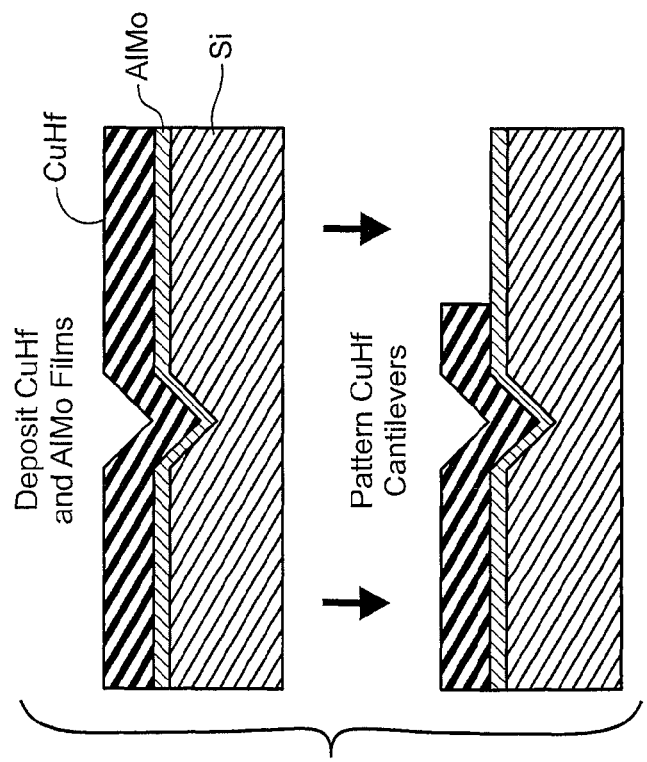

Inspection of FIG. 7 clearly reveals that the crystalline films (Cu, $Cu_{21}Hf_{79}$, Hf) are not suitable candidates, as the bending force curves increase rapidly and will result in unusably bent cantilevers. To confirm this prediction, pure copper cantilevers were fabricated. As seen in FIG. 8, pure Cu cantilevers undergo significant bending. In comparison, the bending force curves of the glassy films ($Cu_{90}Hf_{10}$—$Cu_{30}Hf_{70}$) are flat and slowly increasing, making them attractive candidates. Films of $Cu_{42}Hf_{58}$ exhibit an almost perfect uniform stress distribution, having near-zero bending force at a thickness of 800 nm.

Reducing wear in metal coatings is typically accomplished by increasing the hardness of the coating [10]. Using this design principle, it is optimal to fabricate probes from $Cu_{68}Hf_{32}$, having a nanoindentation hardness of 7.1 GPa, although, for glassy films, an increase in hardness correlates with a reduction in ductility. Therefore a high hardness tip will maintain a sharp tip during operation, but undergo catastrophic shear banding failure. Alternatively low solute concentration glassy films will experience a somewhat gradual reduction in tip resolution while maintaining conductivity throughout, but will have a greatly enhanced total lifetime. From this perspective, $Cu_{90}Hf_{10}$ is an excellent compromise between hardness and ductility.

Film oxidization is also an important concern, which can degrade conductivity, mechanical properties and tip geometry. Moreover, strongly oxidizing films may have limited use in aqueous environments. To characterize film oxidation behavior they were left in atmosphere for a period of 3 months then analyzed using EDX. It was found that oxide content increased significantly with hafnium concentration. The $Cu_{90}Hf_{10}$ film had the lowest oxide content of all alloy films, possessing 5 at. % oxygen concentration.

Finally, if the goal is to maximize the conductivity of the probes, that may be achieved by minimizing the solute content. Based on all of the above design constraints, it is found that $Cu_{90}Hf_{10}$ provides a good combination of internal stress gradients, hardness, ductility, oxidization and conductivity.

Example 7

Fabrication and Testing of Cu—Hf AFM Probes

FIG. 9 illustrates the steps of one example used for the microfabrication of $Cu_{90}Hf_{10}$ AFM probes. The fabrication procedure comprises of four main steps: tip mold fabrication, film deposition and cantilever patterning, probe release, and block attachment.

The starting point for this method is the patterning of inverted pyramidal pits in a silicon wafer, which is to be used as a mold for the probe tips. Other substrates, such as a germanium wafer, are also possible. The pyramidal pits are formed by potassium hydroxide (KOH) etching (33 wt %, 70° C.) of exposed square areas. Prior to KOH etching, a 75 nm Au masking layer is deposited onto a (001)-oriented Si wafer, with a 15 nm Cr adhesion layer (FIG. 9(a)), followed by spin-coating a 1.2 µm thick layer of positive HPR 504 resist. Other embodiments of masking layers are possible, including $Si_3N_4$. Using optical lithography an array of square holes are patterned in the Au masking layer (FIG. 9(b)). The Au layer is etched using a mixture of 5% $I_2$+10% KI+85% $H_2O$ [31] and the Cr adhesion layer is etched using a Cyantek CR-7 chromium etch [31].

The tip radius and subsequent spatial resolution of the AFM probes are significantly affected by knife-edging during the KOH etching procedure. During lithography the square openings used for KOH etching are oriented at 45° with respect to the wafer flat. As shown by Sarajlic et al. [32] the knife edge length at the tip of the pyramidal pits is minimized in this configuration. This was found to improve both tip radius and consistency across the entire wafer. Once the tip mold has been machined, a film of $Cu_{90}Hf_{10}$ is deposited on the tip mold and patterned into cantilevers (FIGS. 9(c) and 9(d)). The $Cu_{90}Hf_{10}$ film is patterned using optical lithography and etched using a Cyantek CR-7 chromium etch. To release the cantilevers from the substrate a sacrificial layer is deposited onto the mold prior to deposition of the $Cu_{90}Hf_{10}$ film.

The applicants have previously found that, in aluminum-molybdenum thin films, a small addition of Mo to Al resulted in a dramatic reduction of surface roughness [16, 33]. Therefore $Al_{94}Mo_6$ was chosen as a sacrificial layer, since it is rapidly etched by KOH and is much smoother than pure Al. A 200 nm thick layer of $Al_{94}Mo_6$ was found to provide both reasonable etch rates and tip radii.

Lastly, the patterned $Cu_{90}Hf_{10}$ probes are removed from the substrate. Small silicon blocks (1.6 mm×3.4 mm), to be used as holders, are cut by a diamond saw then bonded to the $Cu_{90}Hf_{10}$ film with an adhesive. The $Cu_{90}Hf_{10}$ film is easily pulled off the surface due to the undercutting during the KOH etch of the $Al_{94}Mo_6$ sacrificial layer.

Example 8

Characterization and Testing of $Cu_{90}Hf_{10}$ Probes

Figure 10:
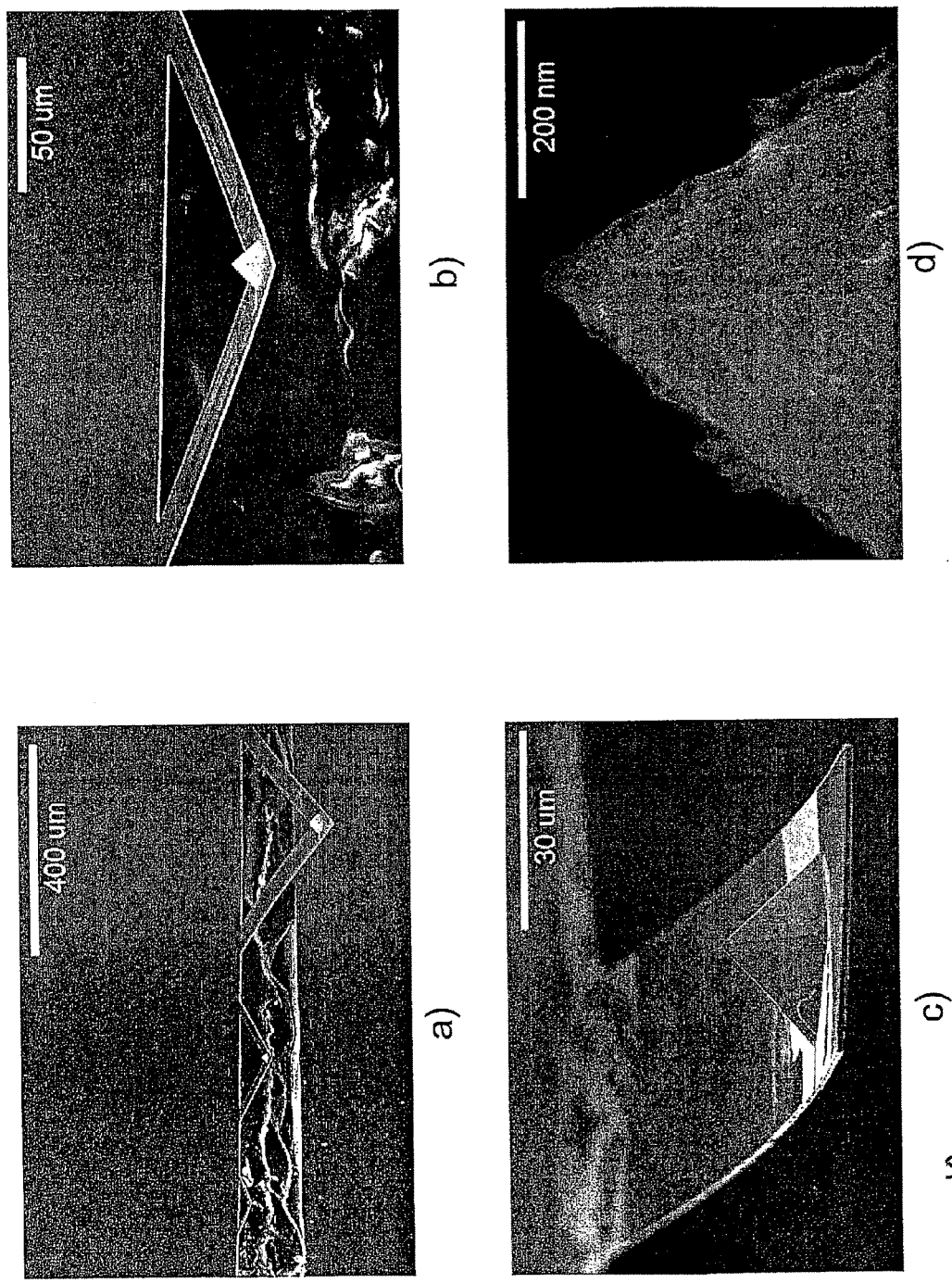
FIGS. 10A-10D shows a series of SEM images characterizing the quality of 1 μm thick $Cu_{90}Hf_{10}$ AFM cantilevers and tips.

Using a Hitachi S-4800 SEM, both the quality of the tips and the amount of cantilever bending is characterized. FIG. 10 shows a series of SEM images characterizing the quality of $Cu_{90}Hf_{10}$ AFM probes. In FIG. 10(a), a set of three cantilevers with lengths of 100, 200 and 400 µm is shown. The 100 and 200 µm long cantilevers are essentially flat, while the very long 400 µm cantilever exhibits some bending. Zooming in on a 200 µm long cantilever (FIG. 10(b)), it may be seen to have zero curvature and appears to be sharp. Zooming in even further on the apex of a tip (FIG. 10(d)), the tip appears quite sharp with a sub-10 nm tip radius.

Of the devices judged to be of sufficient quality to be used in an AFM, the average tip radius is estimated to be between 20 and 30 nm, comparing well to commercially available metal-coated tips which typically have tip radii greater than 20 nm.

Table 1 shows a comparison of the mechanical properties of $Cu_{90}Hf_{10}$ to more common AFM materials (Si and $Si_3N_4$) for a cantilever 125 µm in length, 4 µm thick and 40 µm wide, which is a typical geometry for commercial tapping mode cantilevers. The elastic modulus of $Cu_{90}Hf_{10}$ is determined from nanoindentation and found to be E 68 GPa. The speed of sound, $v_s=\sqrt{(E/\rho)}$, is calculated by using a rule of mixtures to estimate the density, giving a value of $\rho \approx 9.4 \times 10^3$ kg m$^{-3}$. The spring constant k, is estimated using $k=Eh^3W/4L^3$ [2] and the resonant frequency $f_0$ is calculated using the well-known expression $$f_0 = \frac{(\lambda_n)^2 h}{4\pi L^2} \sqrt{\frac{E}{3\rho}} \quad (13)$$

$$\lambda_n \approx 1.875, 4.694, 7.855, 10,996, 14,137. \quad (14)$$

The results in Table 1 demonstrate that $Cu_{90}Hf_{10}$ cantilevers are intrinsically more compliant and possess lower resonant frequencies than those made from more common AFM materials, such as Si and $Si_3N_4$. As previously discussed, $Cu_{90}Hf_{10}$ cantilevers can be fabricated to arbitrary thicknesses.

TABLE 1

Comparison of the mechanical properties of $Cu_{90}Hf_{10}$ to more common AFM materials (Si and $Si_3N_4$) for a cantilever 125 µm in length, 4 µm thick and 40 µm wide. Mechanical properties of Si and $Si_3N_4$ are those reported by Hall [34] and Albrecht et al [2].

|  | E (GPa) | $\sqrt{E/\rho}$ (km s$^{-1}$) | k (N m$^{-1}$) | $f_0$ (kHz) |
|---|---|---|---|---|
| (100) Si | 166 | 8.43 | 64 | 349 |
| LPCVD $Si_3N_4$ | 143 | 6.81 | 47 | 282 |
| $Cu_{90}Hf_{10}$ | 68 | 2.70 | 22 | 112 |

Therefore, if a specific application requires higher frequency $Cu_{90}Hf_{10}$ AFM probes, it is straightforward to achieve this by fabricating thicker cantilevers. Conversely, $Cu_{90}Hf_{10}$ AFM probes are particularly well suited to applications requiring a high force sensitivity.

The fabricated $Cu_{90}Hf_{10}$ probes were mounted in a commercial AFM system (Dimension 3100 with Nanoscope IV controller, Veeco, Santa Barbara, Calif.) and used to image a known test structure. The test structure consisted of an array of squares with 1 μm×1 μm spacing. The AFM micrograph is acquired using a 150 μm long, 1 μm thick and 50 μm wide $Cu_{90}Hf_{10}$ probe in tapping mode operation.

Figure 11:
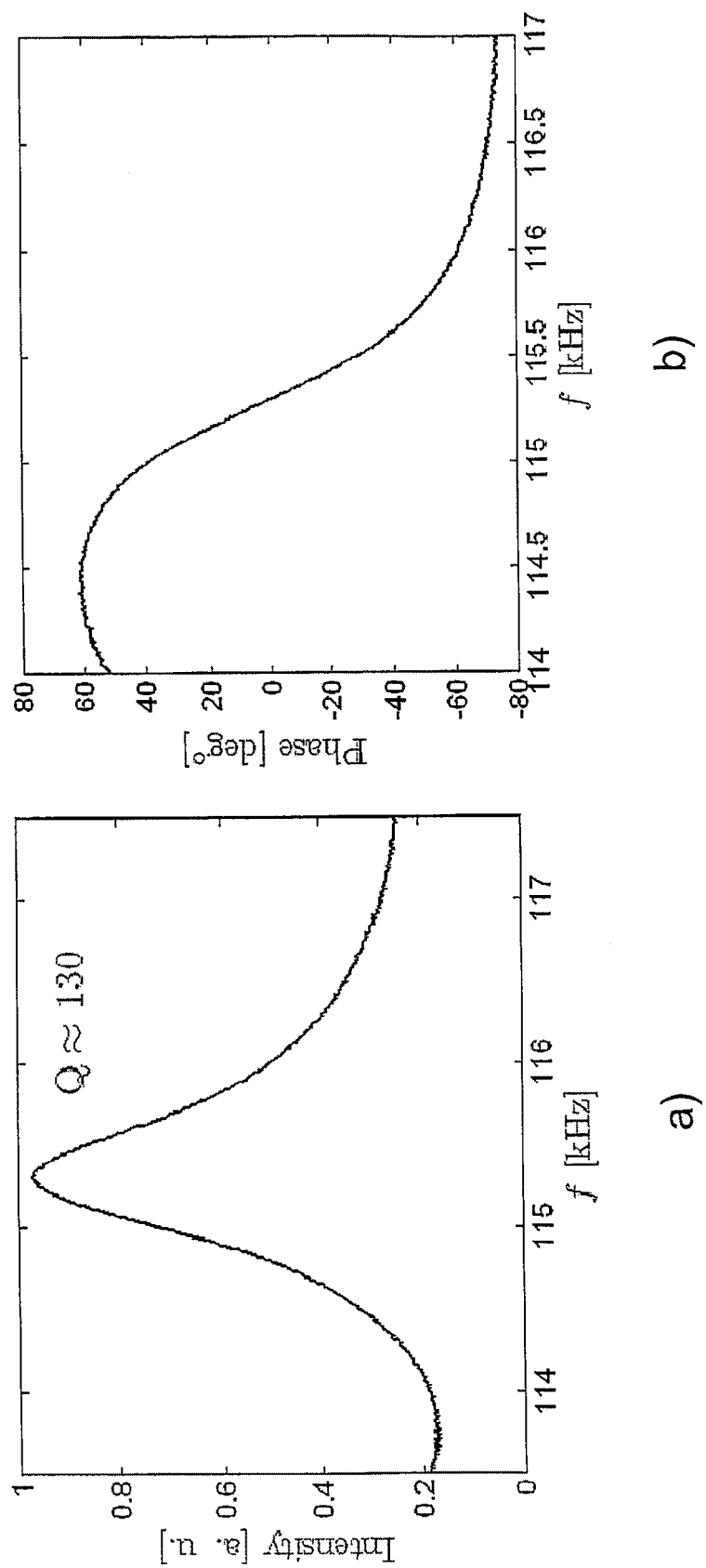
FIG. 11. Resonance characteristic of the second harmonic of the 150 μm long, 1 μm thick and 50 μm wide $Cu_{90}Hf_{10}$ AFM probe used for imaging. (a) Amplitude. (b) Phase.

Using equation (14) and the constants listed in Table 1, the resonant frequency of this cantilever is $f_0=19.4$ kHz. This fundamental frequency is undesirably low for tapping mode imaging. Therefore imaging is performed using the second harmonic, which has a resonant frequency of $f_1=121$ kHz according to equation (14). Shown in FIG. 11 is the resonance characteristic used for imaging, which has a Lorentzian amplitude response, linear phase, quality factor of 130 and center frequency of 115.3 kHz. The quality factor and center frequency are calculated by fitting the amplitude response to a Lorentzian profile.

Figure 12B:
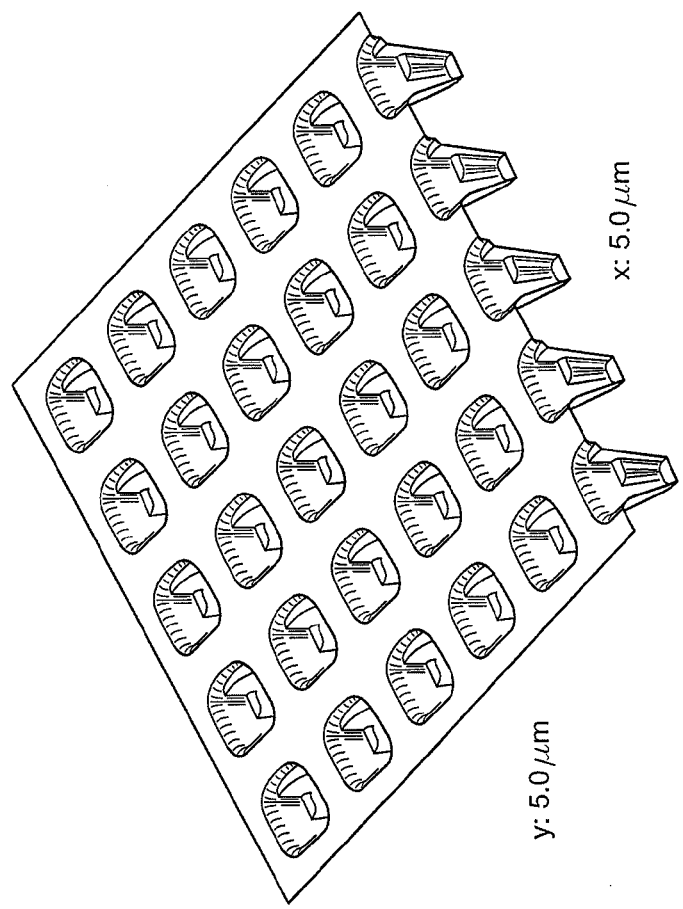
FIG. 12. AFM topograph of a known structure of 1 μm×1 μm square pits imaged using a Cu—Hf AFM probe. (a) Two-dimensional height map. (b) Three-dimensional topograph.
Figure 12A:
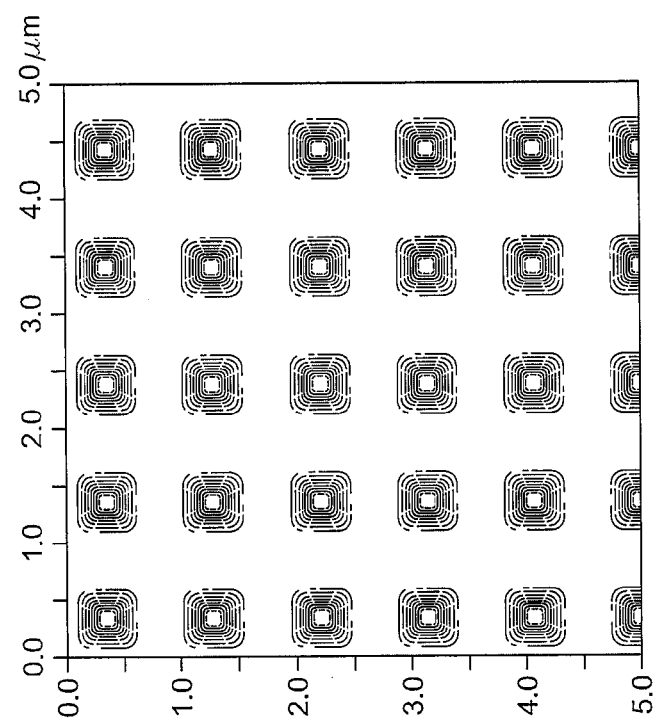

Shown in FIG. 12 is a micrograph of the test structure acquired using the $Cu_{90}Hf_{10}$ probe. Image quality appears to be excellent and the image appears as expected, reproducing the known structure. However, closer inspection of FIG. 12(b) reveals a minor imaging artifact at the edge of the holes: this is likely a result of the roughness on the tip faces, which can be seen in FIG. 10(c). The tip roughness is likely a consequence of incomplete etching of the sacrificial $Al_{94}Mo_6$ layer. By reducing the thickness of the sacrificial layer and increasing the subsequent etch time, tip uniformity is expected to improve. Although no direct study of tip wear was performed, it is noted that six images of the test structure were acquired with the same tip, none of which showed any noticeable signs of image degradation.

REFERENCES

The following references are incorporated herein by reference (where permitted) as if reproduced herein in their entirety.

[1] Binnig G, Rohrer H, Gerber Ch and Weibel E 1982 Surface studies by scanning tunneling microscopy Phys. Rev. Lett. 49 57-61

[2] Albrecht T R, Akamine S, Carver T E and Quate C F 1990 Microfabrication of cantilever styli for the atomic force microscope J. Vac. Sci. Technol. A 8 3386-96

[3] Akamine S, Barrett R C and Quate C F 1990 Improved atomic force microscope images using micro cantilevers with sharp tips Appl. Phys. Lett. 57 316-8

[4] Cavalcoli D, Rossi M, Tomasi A and Cavallini A 2009 Degeneracy and instability of nanocontacts between conductive tips and hydrogenated nanocrystalline Si surfaces in conductive atomic force microscopy Nanotechnology 20 045702

[5] Mamin H J and Rugar D 1992 Thermomechanical writing with an atomic force microscope tip Appl. Phys. Lett. 61 1003-5

[6] Yoshida S, Ono T and Esashi M 2008 Conductive polymer patterned media fabricated by diblock copolymer lithography for scanning multiprobe data storage Nanotechnology 19 475302

[7] Yang F, Wornyo E, Gall K and King W P 2008 Thermomechanical formation and recovery of nanoindents in a shape memory polymer studied using a heated tip Scanning 30 197-202

[8] de Abril O, Gundel A, Maroun F, Allongue P and Schuster R 2008 Single-step electrochemical nanolithography of metal thin films by localized etching with an AFM tip Nanotechnology 19 325301

[9] Johannes M S, Cole D G and Clark R L 2007 Three-dimensional design and replication of silicon oxide nanostructures using an atomic force microscope. Nanotechnology 18 345304

[10] Palacio M and Bhushan B 2008 Nanomechanical and nanotribological characterization of noble metal-coated AFM tips for probe-based ferroelectric data recording Nanotechnology 19 105705

[11] Bhushan B, Palacio M and Kwak K J 2008 Thermally-treated Pt-coated silicon AFM tips for wear resistance in ferroelectric data storage Acta Mater. 56 4233-41

[12] Birkelund K, Thomsen E V, Rasmussen J P, Hansen O, Tang P T, Moller P and Grey F 1997 New approaches to atomic force microscope lithography on silicon J. Vac. Sci. Technol. B 15 2912-5

[13] Radmacher M, Cleveland J P and Hansma P K 1995 Improvement of thermally induced bending of cantilevers used for atomic force microscopy Scanning 17 1170-21

[14] Zou J, Wang X F, Bullen D, Ryu K, Liu C and Mirkin C A 2004 A mould-and-transfer technology for fabricating scanning probe microscopy probes J. Micromech. Microeng. 14 204-11

[15] Chand A, Viani M B, Schaffer T E and Hansma P K 2000 Microfabricated small metal cantilevers with silicon tip for atomic force microscopy J. Microelectromech. Syst. 9 112-6

[16] Lee Z, Ophus C, Fischer L M, Nelson-Fitzpatrick N, Westra K L, Evoy S, Radmilovic V, Dahmen U and Mitlin D 2006 Metallic NEMS components fabricated from nanocomposite Al—Mo films Nanotechnology 17 3063-70

[17] Luber E, Mohammadi R, Ophus C, Lee Z, Fitzpatrick N N, Westra K, Evoy S, Dahmen U, Radmilovic V and Mitlin D 2008 Tailoring the microstructure and surface morphology of metal thin films for nano-electro-mechanical systems applications Nanotechnology 19 Q.4

[18] Duan G, Xu D H and Johnson W L 2005 High copper content bulk glass formation in bimetallic Cu—Hf system Metall. Mater. Trans. A 36A 455-8

[19] Oliver W C and Pharr G M 2004 Measurement of hardness and elastic modulus by instrumented indentation: advances in understanding and refinements to methodology J. Mater. Res. 19 3

[20] Shull A L and Spaepen F 1996 Measurements of stress during vapor deposition of copper and silver thin films and multilayers J. Appl. Phys. 80 6243-56

[21] Dmowski W, Egami T, Swider-Lyons K E, Yan W, Dai S and Overbury S H 2007 Local atomic structure in disordered and nanocrystalline catalytic materials Z. Kristallogr. 222

[22] Sheng H W, Luo W K, Alamgir F M, Bai J M and Ma E 2006 Atomic packing and short-to-medium-range in metallic glasses Nature 439 419-25

[23] Drits V, Srodon L and Eberl D D 2007 XRD measurement of mean crystalline thickness of illite and illite/smectite: reappraisal of the Kubler index and the Scherrer equation Clays Clay Miner. 45 461-75

[24] Bhatia A B and Thornton D E 1970 Structural aspects of the electrical resistivity of binary alloys Phys. Rev. B 2 3004-12

[25] Singh R N and Sommer F 1992 Temperature-dependence of the thermodynamic functions of strongly interacting liquid alloys J. Phys.: Condens. Matter 4 5345-58

[26] Liang D and Liu Y 2006 Reevaluation of the Cu—Hf binary system J. Alloys Compounds 426 101-5

[27] Zhang L, Cheng Y Q, Cao A J, Xu J and Ma E 2009 Bulk metallic glasses with large plasticity: composition design from the structural perspective Acta Mater. 57 1154-64

[28] Spaepen F 2000 Interfaces and stresses in thin films Acta Mater. 48 31-42
[29] Thompson C V and Carel R 1996 Stress and grain growth in thin films J. Mech. Phys. Solids 44 4657-73
[30] Senturia S D 2001 Microsystem Design (New York, N.Y.: Springer+BusinessMedia Inc.)
[31] Williams K R, Gupta K and Wasilisk M 2003 Etch rates for micromachining processing—part ii J. Micromech. Microeng. 12 761-78
[32] Sarajlic E, Yamahata C and Fujita H 2007 Towards wet anisotropic silicon etching of perfect pyramidal pits Microelectron. Eng. 84 1419-22
[33] Ophus C, Fitzpatrick N N, Lee Z, Luber E, Harrower C, Westra K, Dahmen U, Radmilovic V, Evoy S and Mitlin D 2008 Resonance properties and microstructure of ultra-compliant metallic nanoelectromechanical systems resonators synthesized from Al-32Mo amorphous-nanocrystalline metallic composites Appl. Phys. Lett. 92
[34] Hall J J 1967 Electronic effects in the elastic constants of n-type silicon Phys. Rev. 161 756-61
[35] Sandberg R, Svendsen W, Molhave K and Boisen A 2005 Temperature and pressure dependence of resonance in multi-layer microcantilevers J. Micromech. Microeng. 15 1454

The invention claimed is:

1. An all-metal microdevice or nanodevice comprising a copper-hafnium alloy thin film having an x-ray amorphous microstructure.

2. The micro/nanodevice of claim 1 wherein the copper-hafnium alloy comprises 30% copper to 95% copper and 5% hafnium to 70% hafnium.

3. The micro/nanodevice of claim 1 which is an atomic force microscope (AFM) cantilever probe.

4. The micro/nanodevice of claim 1 wherein the Cu—Hf alloy comprises an amorphous matrix with interspersed crystalline nanoparticles.

5. The micro/nanodevice of claim 3 which comprises $Cu_{90}Hf_{10}$.

6. The micro/nanodevice of claim 4 which comprises $Cu_{90}Hf_{10}$.

7. The AFM cantilever probe of claim 3 wherein the cantilever is about 1 μm thick.

8. The AFM cantilever probe of claim 7 wherein the cantilever has a length of between about 100 to 400 μm.

9. The AFM cantilever probe of claim 7 which has a tip radius of between 10 to 40 nm.

* * * * *